United States Patent
Hansen et al.

(10) Patent No.: US 9,394,805 B2
(45) Date of Patent: Jul. 19, 2016

(54) DIODE ELECTRICAL GROUND FOR FAN BLADES

(71) Applicant: United Technologies Corporation, Hartford, CT (US)

(72) Inventors: James O. Hansen, Glastonbury, CT (US); Thomas J. Garosshen, Glastonbury, CT (US); Thomas J. Watson, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 887 days.

(21) Appl. No.: 13/714,779

(22) Filed: Dec. 14, 2012

(65) Prior Publication Data

US 2014/0083080 A1    Mar. 27, 2014

Related U.S. Application Data

(60) Provisional application No. 61/706,339, filed on Sep. 27, 2012.

(51) Int. Cl.
  *F01D 25/00* (2006.01)
  *F01D 5/30* (2006.01)

(52) U.S. Cl.
  CPC ...... *F01D 25/00* (2013.01); *F01D 5/30* (2013.01); *F01D 25/007* (2013.01); *Y02T 50/671* (2013.01)

(58) Field of Classification Search
  CPC ....... F01D 5/30; F01D 5/3007; F01D 5/3023; F01D 5/3069; F01D 5/147; F04D 29/324; F04D 29/325; F04D 29/388
  See application file for complete search history.

(56) References Cited

U.S. PATENT DOCUMENTS

| | | | |
|---|---|---|---|
| 4,274,697 A | 6/1981 | Dodge et al. | |
| 4,651,521 A * | 3/1987 | Ossi | F01D 15/12 60/226.3 |
| 5,123,813 A | 6/1992 | Przytulski et al. | |
| 6,004,101 A * | 12/1999 | Schilling | F01D 5/28 416/219 R |

(Continued)

FOREIGN PATENT DOCUMENTS

| | | |
|---|---|---|
| EP | 2353830 | 8/2011 |
| EP | 2405101 | 1/2012 |

OTHER PUBLICATIONS

International Search Report and Written Opinion for International Application No. PCT/US2013/061105 completed on Dec. 17, 2013.

(Continued)

*Primary Examiner* — Dwayne J White
*Assistant Examiner* — Julian Getachew
(74) *Attorney, Agent, or Firm* — Carlson, Gaskey & Olds, PC

(57) ABSTRACT

A rotor has a rotor body with at least one slot receiving a blade. The blade has an outer surface, at least at some areas, formed of a first material and having an airfoil extending from a dovetail. The dovetail is received in the slot. A diode is in contact with a portion of the dovetail formed of a second material that is more electrically conductive than the first material. The diode is in contact with a rotating element that rotates with the rotor. The rotating element is formed of a third material. The first material is less electrically conductive than the third material. The diode and the rotating element together form a ground path from the portion of the dovetail into the rotor. An engine and a fan blade are also disclosed.

20 Claims, 2 Drawing Sheets

(56) References Cited

U.S. PATENT DOCUMENTS

| | | | |
|---|---|---|---|
| 6,607,358 B2 * | 8/2003 | Finn | B23P 15/04 416/224 |
| 7,462,074 B1 | 12/2008 | Devlin et al. | |
| 8,851,855 B2 * | 10/2014 | James | F01D 5/282 416/224 |
| 2010/0119385 A1 * | 5/2010 | Hanaoka | F04D 27/004 417/244 |
| 2011/0142644 A1 | 6/2011 | Fritz et al. | |
| 2011/0194941 A1 | 8/2011 | Parkin et al. | |
| 2012/0003100 A1 | 1/2012 | James et al. | |
| 2012/0082553 A1 | 4/2012 | Eleftheriou et al. | |

OTHER PUBLICATIONS

International Preliminary Report on Patentability for International Application No. PCT/US2013/061105 mailed Apr. 9, 2015.

European Search Report for European Patent Application No. 12196763.2 completed Feb. 6, 2013.

* cited by examiner

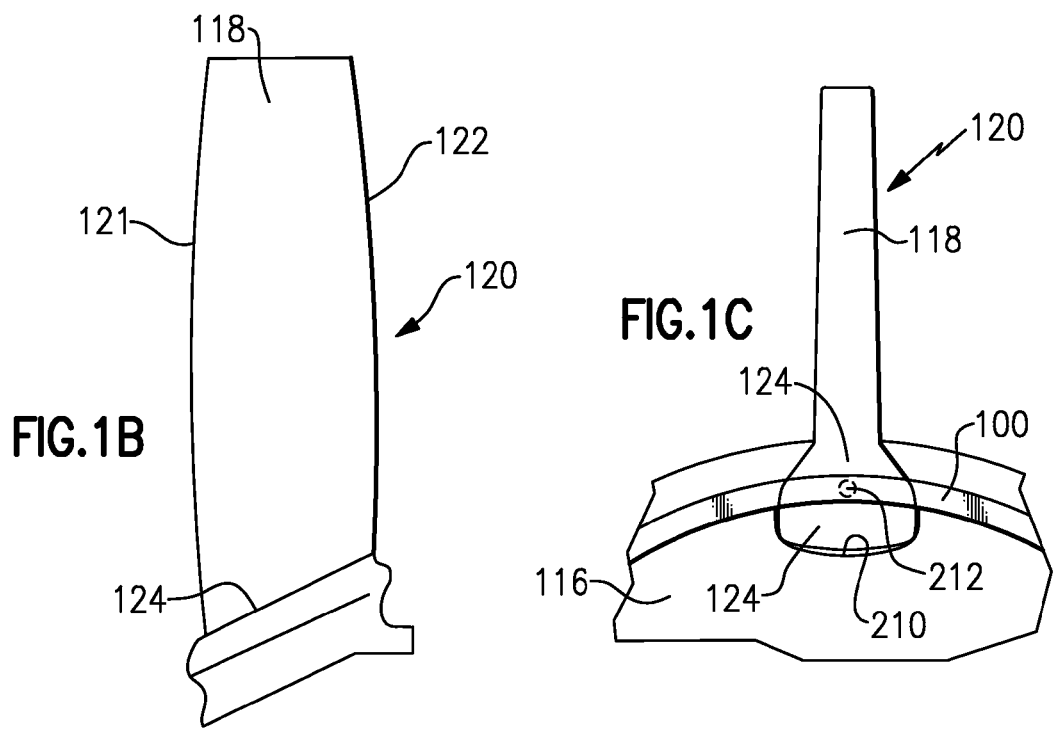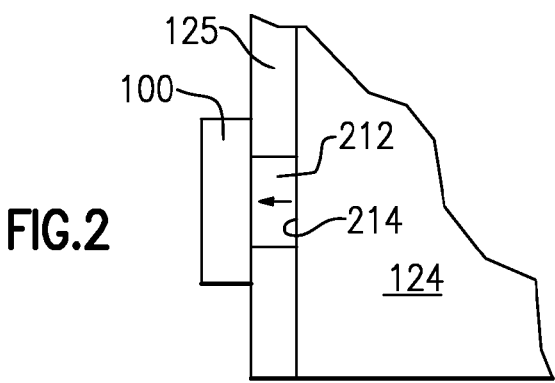

DIODE ELECTRICAL GROUND FOR FAN BLADES

CROSS-REFERENCE TO RELATED APPLICATION

This application claims priority to U.S. Provisional Application Ser. No. 61/706,339, filed 27 Sep. 2012.

BACKGROUND OF THE INVENTION

This application relates to a structure for electrically grounding fan blades for use in a gas turbine engine.

Gas turbine engines are known, and typically include a fan delivering air into a compressor section. In the compressor section, the air is compressed and then delivered into a combustion section. The compressed air is mixed with fuel and burned in the combustion section. Products of this combustion pass downstream to drive turbine rotors.

The fan blades are subject to a large volume of air moving across an airfoil, and this can build up a large static electric charge. Conventionally, the fan blades were formed of a conductive metal that was grounded to a hub that mounts the fan blade. As such, the charge would dissipate.

More recently, fan blades have become larger. One factor allowing the larger fan blades is the use of a gear reduction between a turbine driven spool, which drives the fan blade, and the spool. The gear reduction allows a single turbine rotor to drive both a compressor section and the fan, but at different speeds.

As the size of the fan blade has increased, its weight has also increased. As such, efforts have been made to reduce the weight of fan blades. One modification is to change the material for the fan blade from titanium to aluminum. The aluminum fan blades have been covered with a polyurethane coating and fabric wear pads to protect the aluminum. These materials have insulation qualities and, thus, the blade may not be electrically grounded to a rotor.

SUMMARY

In a featured embodiment, a rotor for use in a gas turbine engine has a rotor body with at least one slot receiving a blade. The blade has an outer surface, at least at some areas, formed of a first material and an airfoil extending from a dovetail. The dovetail is received in the slot. A diode is in contact with a portion of the dovetail formed of a second material that is more electrically conductive than the first material. The diode is in contact with a rotating element that rotates with the rotor. The rotating element is formed of a third material. The first material is less electrically conductive than the third material. The diode and rotating element together form a ground path from the portion of the dovetail into the rotor.

In another embodiment according to the previous embodiment, the first material includes an outer coating that is relatively non-conductive compared to the second and third materials.

In another embodiment according to any of the previous embodiments, the second material is aluminum, and the third material includes titanium.

In another embodiment according to any of the previous embodiments, the diode contacts the portion of the dovetail at an area of the dovetail where the outer coating has not been deposited.

In another embodiment according to any of the previous embodiments, the diode blocks flow of electric charge from the rotating element into the portion of the dovetail.

In another embodiment according to any of the previous embodiments, the rotating element is separate from the rotor.

In another embodiment according to any of the previous embodiments, the rotating element is a lock ring which secures the blade within the rotor. The grounding element contacts the lock ring, and the lock ring contacts the rotor to provide the grounding path.

In another embodiment according to any of the previous embodiments, the rotor is a fan rotor and the blade is a fan blade.

In a featured embodiment, a gas turbine engine has a fan section, a compressor section, a combustor section, and at least one turbine rotor. The at least one turbine rotor drives a compressor rotor, and a fan rotor of the fan section through a gear reduction. The fan blade has an outer surface, at least at some areas, formed of a first material and an airfoil extending from a dovetail. The dovetail is received in a slot in the fan rotor. A diode is in contact with a portion of the dovetail formed of a second material that is more electrically conductive than the first material. The diode is in contact with a rotating element that rotates with the rotor. The rotating element is formed of a third material. The first material is less electrically conductive than the third material. The diode and rotating element together form a ground path from the portion of the dovetail into the rotor.

In another embodiment according to the previous embodiment, the first material includes an outer coating that is relatively non-conductive compared to the second and third materials.

In another embodiment according to any of the previous embodiments, the second material is aluminum, and the third material includes titanium.

In another embodiment according to any of the previous embodiments, the diode contacts the portion of the dovetail at an area of the dovetail where the outer coating has been masked to not be deposited.

In another embodiment according to any of the previous embodiments, the diode blocks flow of electric charge from the rotating element into the portion of the dovetail.

In another embodiment according to any of the previous embodiments, the rotating element is separate from the rotor.

In another embodiment according to any of the previous embodiments, the rotating element is a lock ring which secures the fan blade within the rotor. The grounding element contacts the lock ring. The lock ring contacts the rotor to provide the grounding path.

In another featured embodiment, a fan blade and grounding element have a fan blade with an outer surface, at least at some areas, formed of a first material and an airfoil extending from a dovetail. A diode is in contact with a portion of the dovetail formed of a second material that is more electrically conductive than the first material, such that the diode can contact a rotating element when the fan blade is received in a rotor to provide a ground path from the portion of the dovetail into the rotor.

In another embodiment according to the previous embodiment, the first material includes an outer coating that is relatively non-conductive compared to the second and third materials.

In another embodiment according to any of the previous embodiments, the second material is aluminum, and the third material includes titanium.

In another embodiment according to any of the previous embodiments, the diode contacts the portion of the dovetail at an area of the dovetail where the outer coating has been masked to not be deposited.

In another embodiment according to any of the previous embodiments, the diode blocks flow of electric charge from the rotating element into the portion of the dovetail.

BRIEF DESCRIPTION OF THE DRAWINGS

FIG. 1B shows an aluminum fan blade.
FIG. 1C shows the aluminum fan blade mounted into a rotor.
FIG. 2 shows details of a grounding arrangement.

DETAILED DESCRIPTION

Figure 1A:
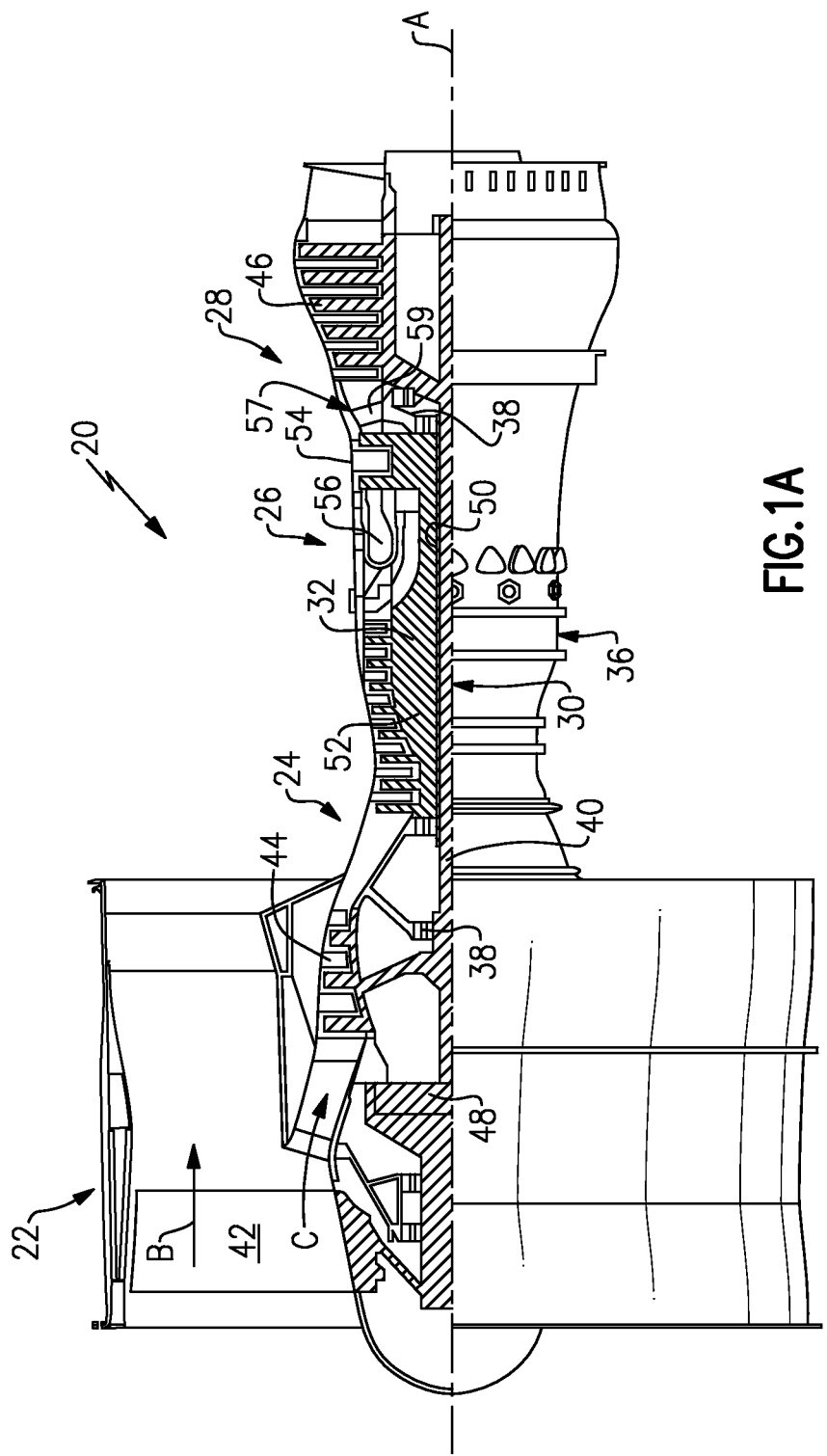
FIG. 1A shows an exemplary gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

A fan blade 120 is illustrated in FIG. 1B having an airfoil 118 extending radially outwardly from a dovetail or root 124. A leading edge 121 and a trailing edge 122 define the forward and rear limits of the airfoil 118. The fan blade 120 may be used in an engine such as the engine 20.

As shown in FIG. 1C, a fan rotor 116 receives the dovetail 124 in a slot 210 to mount the fan blade 120 with the airfoil 118 extending radially outwardly. As the rotor is driven to rotate, it carries the fan blade 120 with it.

A lock ring 100 locks the blades 120 within the rotor 116 and rotates with the rotor 116.

The lock ring 100 and the rotor 116 may be formed of titanium or a titanium alloy, while the blade 120 may be formed of aluminum, but having an outer surface coated with a non-conductive coating, such as polyurethane coating 125 (see FIG. 2), or including fabric pads. As such, the fan blade 120 is not grounded.

A diode 212 is positioned between an aluminum surface on the blade 120 and the lock ring 100. As known, a diode allows flow of electrical charge in one direction, but blocks flow in the other to the rotor 116.

As shown in FIG. 2, the diode 212 is positioned at a masked area or portion 214 of the dovetail 124 where the coating 125 has not been deposited. As such, the diode 212 contacts a portion 214 of the dovetail 124 formed of, and allows dissipation of the static charge to the lock ring 100. However, the static charge will not flow in the opposed direction.

As known, it is desirable not to allow charge to flow from the rotor 116 or the lock ring 100 to the aluminum on the fan blade 120, as this can lead to galvanic corrosion. Diode 212 will block flow in that direction.

The use of the diode, which is effectively an electronic check valve, prevents this result. In one embodiment, a "face diode" is utilized. However, other type diodes could be utilized in embodiments of this grounding system.

It could be said that the outer surface of the blade is formed of a first material, the diode is in contact with a portion of the dovetail formed of a second material, and a rotating element which is connected by the diode to said portion of the dovetail is formed of a third material. The first material is less electrically conductive than the first material. Further, the first material is less electrically conductive than the second material.

While the disclosed embodiment provides contact between the grounding element 202 and the lock ring 100, it is also possible to have the grounding element contact the rotor 116 directly. For purposes of interpreting this application, the term "rotating element," which is connected to the portion of the dovetail by the diode, it could be the lock ring, the rotor itself, or another portion of a fan section that rotates with the rotor. Also, while the specific disclosure is on a fan blade, the application may extend to other applications.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor for use in a gas turbine engine comprising:
    a rotor body having at least one slot receiving a blade;
    said blade having an outer surface, at least at some areas, formed of a first material and having an airfoil extending from a dovetail, said dovetail received in said slot; and
    a diode in contact with a portion of said dovetail, said portion formed of a second material that is more electrically conductive than said first material, and said diode being in contact with a rotating element that rotates with said rotor, said rotating element being formed of a third material, and said first material being less electrically conductive than said third material, said diode and said rotating element together forming a ground path from said portion of said dovetail into said rotor.

2. The rotor as set forth in claim 1, wherein said first material includes an outer coating that is relatively non-conductive compared to said second and third materials.

3. The rotor set forth in claim 2, wherein said second material is aluminum, and said third material includes titanium.

4. The rotor as set forth in claim 2, wherein said diode contacts said portion of said dovetail at an area of said dovetail where said outer coating has not been deposited.

5. The rotor as set forth in claim 1, wherein said diode blocks flow of electric charge from said rotating element into said portion of said dovetail.

6. The rotor as set forth in claim 1, wherein said rotating element is separate from said rotor.

7. The rotor as set forth in claim 6, wherein said rotating element is a lock ring which secures said blade within said rotor, said grounding element contacts said lock ring, and said lock ring contacts said rotor to provide said grounding path.

8. The rotor as set forth in claim 1, wherein said rotor is a fan rotor and said blade is a fan blade.

9. A gas turbine engine comprising:
    a fan section, a compressor section, a combustor section, and at least one turbine rotor, said at least one turbine rotor driving a compressor rotor, and said at least one turbine rotor also driving a fan rotor of said fan section through a gear reduction;
    said fan rotor having at least one fan blade having an outer surface, at least at some areas, formed of a first material and having an airfoil extending from a dovetail, said dovetail received in a slot in said fan rotor; and
    a diode in contact with a portion of said dovetail, said portion formed of a second material that is more electrically conductive than said first material, and said diode being in contact with a rotating element that rotates with said fan rotor, said rotating element being formed of a third material, and said first material being less electrically conductive than said third material, said diode and said rotating element together forming a ground path from said portion of said dovetail into said rotor.

10. The gas turbine engine as set forth in claim 9, wherein said first material includes an outer coating that is relatively non-conductive compared to said second and third materials.

11. The gas turbine engine as set forth in claim 10, wherein said second material is aluminum, and said third material includes titanium.

12. The gas turbine engine as set forth in claim 10, wherein said diode contacts said portion of said dovetail at an area of said dovetail where said outer coating has been masked to not be deposited.

13. The gas turbine engine as set forth in claim 9, wherein said diode blocks flow of electric charge from said rotating element into said portion of said dovetail.

14. The gas turbine engine as set forth in claim 9, wherein said rotating element is separate from said fan rotor.

15. The gas turbine engine as set forth in claim 14, wherein said rotating element is a lock ring which secures said fan blade within said fan rotor, said grounding element contacts said lock ring, and said lock ring contacts said rotor to provide said grounding path.

16. A fan blade and grounding element comprising:
    a fan blade having an outer surface, at least at some areas, formed of a first material and having an airfoil extending from a dovetail; and
    a diode in contact with a portion of said dovetail, said portion formed of a second material that is more electrically conductive than said first material, such that said diode will contact a rotating element when said fan blade is received in a rotor to provide a ground path from said portion of said dovetail into the rotor.

17. The fan blade as set forth in claim 16, wherein said first material includes an outer coating that is relatively non-conductive compared to said second material.

18. The fan blade as set forth in claim 17, wherein said second material is aluminum.

19. The fan blade set forth in claim 17, wherein said diode contacts said portion of said dovetail at an area of said dovetail where said outer coating has been masked to not be deposited.

20. The fan blade as set forth in claim 16, wherein said diode blocks flow of electric charge from said rotating element into said portion of said dovetail.

* * * * *